(12) United States Patent
Chan et al.

(10) Patent No.: US 8,411,412 B2
(45) Date of Patent: Apr. 2, 2013

(54) CERAMIC POWDER COMPOSITION, CERAMIC MATERIAL, AND MULTILAYER CERAMIC CAPACITOR FABRICATED THEREBY

(75) Inventors: Yueh-Lin Chan, Tainan (TW); Ting-An Chien, Tainan County (TW); Hsiu-Hsiang Pei, Kaohsiung (TW); Chao-Kuang Hsiao, Tainan (TW)

(73) Assignee: Darfon Electronics Corp., Taoyuan County (TW)

( * ) Notice: Subject to any disclaimer, the term of this patent is extended or adjusted under 35 U.S.C. 154(b) by 175 days.

(21) Appl. No.: 13/006,786

(22) Filed: Jan. 14, 2011

(65) Prior Publication Data

US 2011/0176253 A1 Jul. 21, 2011

(30) Foreign Application Priority Data

Jan. 15, 2010 (TW) ................................ 99101041 A

(51) Int. Cl.
*H01G 4/06* (2006.01)
*C04B 35/00* (2006.01)
(52) U.S. Cl. .................. 361/321.4; 361/321.5; 501/137
(58) Field of Classification Search .... 361/321.1–321.5; 501/137–138
See application file for complete search history.

(56) References Cited

U.S. PATENT DOCUMENTS

| 6,403,513 | B1* | 6/2002 | Sato et al. ..................... 501/137 |
| 6,828,266 | B1* | 12/2004 | Park et al. ..................... 501/139 |
| 2003/0147194 | A1* | 8/2003 | Hibi et al. ..................... 361/118 |
| 2010/0165542 | A1* | 7/2010 | Sohn et al. ..................... 361/313 |
| 2011/0164346 | A1* | 7/2011 | Tamura et al. .............. 361/321.1 |

\* cited by examiner

*Primary Examiner* — Eric Thomas
(74) *Attorney, Agent, or Firm* — WPAT PC; Justin King

(57) ABSTRACT

A ceramic powder composition, a ceramic material and a multi-layer ceramic capacitor fabricated thereby are presented. The ceramic powder composition includes a main component and a glassy component. A content of the glassy component is 0.2 to 2.0 mole % based on the main component. The main component includes $(Ba_{1-x}Ca_x)_m TiO_3 + \alpha MgO + \beta Re_2O_3 + \gamma MnO + \delta B_2O_5$, where $\alpha$, $\beta$, $\gamma$ and $\delta$ are molar ratio constants, and $0.1 \leq \alpha \leq 3.0$, $0.05 \leq \beta \leq 3.0$, $0.001 \leq \gamma \leq 0.2$, and $0.0 < \delta \leq 0.1$; $0.99 \leq m \leq 1.030$, and $0.005 \leq x \leq 0.015$; element Re is selected from a group consisting of yttrium (Y), chromium (Cr), terbium (Tb), dysprosium (Dy), holmium (Ho), erbium (Er), thulium (Tm), and ytterbium (Yb); and element B is selected from a group consisting of vanadium (V), niobium (Nb), and tantalum (Ta). The glassy component includes $(Ba_y Ca_{1-y})SiO_3$, where $0 < y < 1$.

13 Claims, 2 Drawing Sheets

CERAMIC POWDER COMPOSITION, CERAMIC MATERIAL, AND MULTILAYER CERAMIC CAPACITOR FABRICATED THEREBY

BACKGROUND OF THE INVENTION

1. Field of Invention

The present invention relates to a ceramic powder composition, a ceramic material, and a multi-layer ceramic capacitor fabricated thereby, in particular, to a ceramic powder composition, a ceramic material, and a multi-layer ceramic capacitor fabricated thereby, which meet the X5R temperature range.

2. Related Art

In recent years, as electronic elements develop towards small, chip-based, multi-functional, and high-capacity designs, various integration technologies attract much attention. Similarly, as for capacitors, besides the thin and small and multi-layer design of elements is inevitable, requirements for design of dielectric materials with high capacitance and micro-grain structure become increasingly strict. Therefore, ceramic capacitors also develop in the trend of achieving maximum functions in a minimum volume.

Applications of commercial ceramic capacitors are largely classified into Y5V, X5R, X7R, and X8S specifications, and the specification required by X5R basically refers to a relative capacitance variation of ±15% in a temperature range of −55° C. to 85° C.

SUMMARY OF THE INVENTION

The present invention is directed to a ceramic powder composition, which meets the X5R temperature range.

The present invention is directed to a ceramic material, which meets the X5R temperature range.

The present invention is directed to a multi-layer ceramic capacitor, which meets the X5R temperature range.

The present invention provides a ceramic powder composition, a ceramic material, and a multi-layer ceramic capacitor fabricated thereby. The ceramic powder composition comprises a main component and a glassy component. A content of the glassy component is 0.2-2.0 mole % based on the main component. The main component includes $(Ba_{1-x}Ca_x)_m TiO_3 + \alpha MgO + \beta Re_2O_3 + \gamma MnO + \delta B_2O_5$, where $\alpha$, $\beta$, $\gamma$ and $\delta$ are molar ratio constants, and $0.1 \leq \alpha \leq 3.0$, $0.05 \leq \beta \leq 3.0$, $0.001 \leq \gamma \leq 0.2$, and $0.0 < \delta \leq 0.1$; $0.99 \leq m \leq 1.030$, and $0.005 \leq x \leq 0.015$; element Re is selected from a group consisting of yttrium (Y), chromium (Cr), terbium (Tb), dysprosium (Dy), holmium (Ho), erbium (Er), thulium (Tm), and ytterbium (Yb); and element B is selected from a group consisting of vanadium (V), niobium (Nb), and tantalum (Ta). The glassy component comprises $(Ba_y Ca_{1-y})SiO_3$, where $0 < y < 1$.

The present invention further provides a ceramic material, which is formed by sintering the ceramic powder composition.

The present invention further provides a multi-layer ceramic capacitor, which comprises a ceramic dielectric, a plurality of internal electrodes, and at least one external electrode. The ceramic dielectric is formed by sintering the ceramic powder composition. The internal electrodes substantially extend in parallel in the ceramic dielectric, and the external electrode is exposed out of the ceramic dielectric, and is electrically connected to the internal electrodes.

In summary, the present invention provides a ceramic powder composition, a ceramic material, and a multi-layer ceramic capacitor fabricated thereby that meet the X5R temperature range by using a main component in combination with a glassy component.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
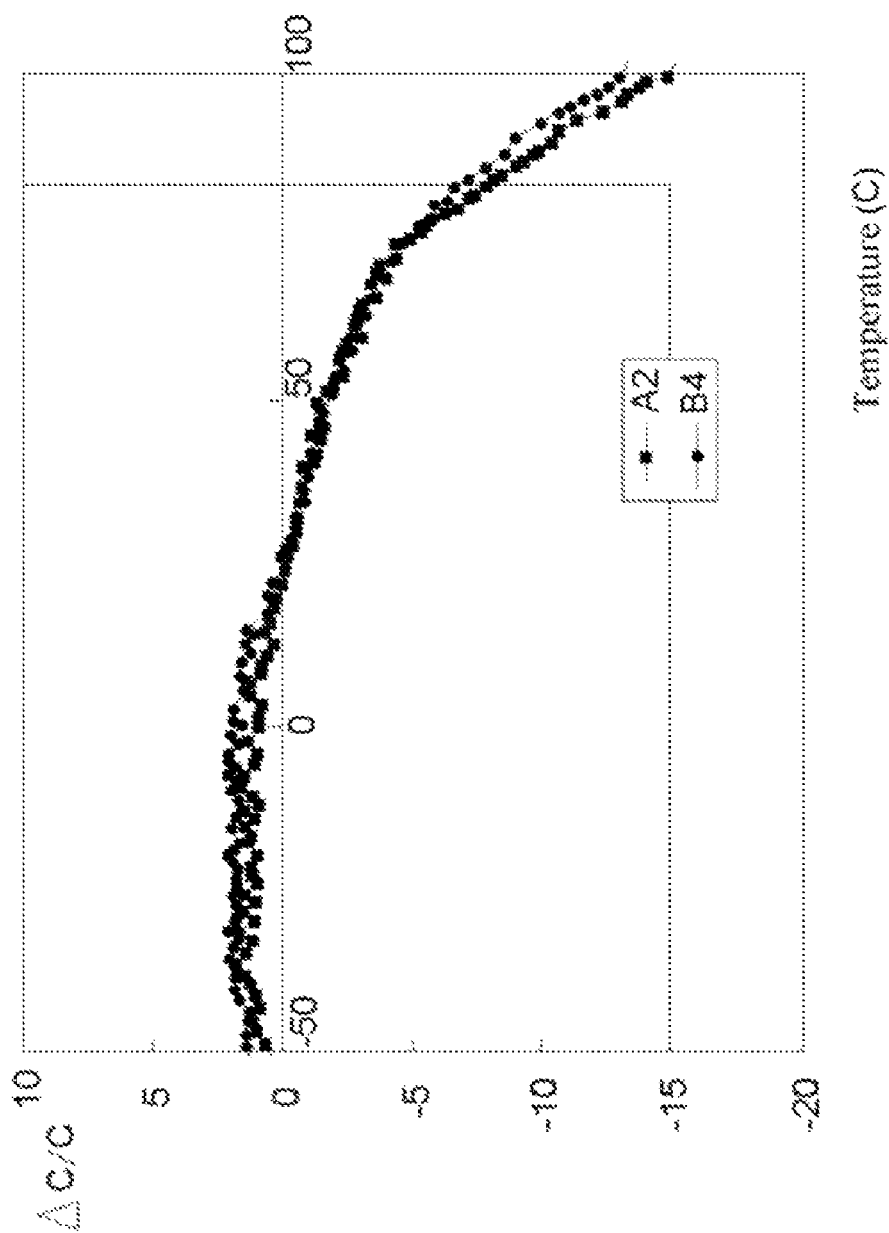
FIG. 1 is a relation diagram of a capacitance variation of multi-layer ceramic capacitors and temperature.

The ceramic powder composition of the present invention is described below with reference to related drawings. For ease of understanding, the same members are used to refer to the same parts in the embodiments.

The ceramic powder composition of the present invention is formed by combining and sintering a main component and a glassy component at a particular ratio. A content of the glassy component is 0.2-2.0 mole % based on the main component, in other words, when a fraction of the main component is 1 mole, a fraction of the glassy component may be ranged from 0.002 to 0.02 mole. A ceramic powder composition meeting the X5R temperature range can be obtained by sintering the main component and the glassy component at the fractions above.

The main component includes $(Ba_{1-x}Ca_x)_m TiO_3 + \alpha MgO + \beta Re_2O_3 + \gamma MnO + \delta B_2O_5$, where $\alpha$, $\beta$, $\gamma$, and $\delta$ are molar ratio constants, and $0.1 \leq \alpha \leq 3.0$, $0.05 \leq \beta \leq 3.0$, $0.001 \leq \gamma \leq 0.2$, and $0.0 < \delta \leq 0.1$; $0.99 \leq m \leq 1.030$, and $0.005 \leq x \leq 0.015$; element Re is selected from a group consisting of yttrium (Y), chromium (Cr), terbium (Tb), dysprosium (Dy), holmium (Ho), erbium (Er), thulium (Tm), and ytterbium (Yb); and element B is selected from a group consisting of vanadium (V), niobium (Nb), and tantalum (Ta).

The glassy component is $(Ba_y Ca_{1-y})SiO_3$ (referred to as BCG hereinafter), where $0 < y < 1$, and a numerical value range of y is essentially $0.3 \leq y \leq 0.6$, and the glassy component BCG is a material comprising BaO, CaO and $SiO_2$.

The main component and the glassy component are combined at the above fractions and sintered at a sintering temperature in a range of 1190 to 1300° C., to form a ceramic material, for use in a multi-layer ceramic capacitor device.

Hereinafter, the present invention is described with reference to Examples 1 to 4, in which the glassy component in Examples 1 to 4 is exemplified with the material BCG; however, the present invention is not limited to the following examples.

EXAMPLE 1

Example 1 is an embodiment in which values X and m in $(Ba_{1-x}Ca_x)_m TiO_3$ in the main component are changed. Referring to Table 1, mixing ratios of MgO, $Y_2O_3$, MnO, $V_2O_5$, and $Cr_2O_3$ in the main component and the glassy component (BCG) are respectively fixed, in which fixed addition mole percentages of MgO, $Y_2O_3$, MnO, $V_2O_5$, $Cr_2O_3$ and BCG are respectively 2.3, 0.13, 0.007, 0.024, 1.74, and 1.87, and values X and m are changed in ranges $0.01 \leq x \leq 0.06$ and $0.9948 \leq m \leq 0.9988$.

Table 2 shows characteristic behaviors of ceramic materials obtained by sintering 9 groups (A1-A9) of raw materials shown in Table 1 at 1235° C. It can be known from Table 2 that the characteristic behaviors of the ceramic powder based composition of Groups A1-A9 all meet the X5R specification.

TABLE 1

| Sample No. | $(Ba_{1-x}Ca_x)_m TiO_3$ | | | | | | | |
|---|---|---|---|---|---|---|---|---|
| | X | MgO | $Y_2O_3$ | MnO | $V_2O_5$ | $Cr_2O_3$ | BCG | m |
| A1 | 0.01 | 2.3 | 0.13 | 0.007 | 0.024 | 1.74 | 1.87 | 0.9988 |
| A2 | 0.01 | 2.3 | 0.13 | 0.007 | 0.024 | 1.74 | 1.87 | 0.9968 |
| A3 | 0.01 | 2.3 | 0.13 | 0.007 | 0.024 | 1.74 | 1.87 | 0.9948 |
| A4 | 0.03 | 2.3 | 0.13 | 0.007 | 0.024 | 1.74 | 1.87 | 0.9988 |
| A5 | 0.03 | 2.3 | 0.13 | 0.007 | 0.024 | 1.74 | 1.87 | 0.9968 |
| A6 | 0.03 | 2.3 | 0.13 | 0.007 | 0.024 | 1.74 | 1.87 | 0.9948 |
| A7 | 0.06 | 2.3 | 0.13 | 0.007 | 0.024 | 1.74 | 1.87 | 0.9988 |
| A8 | 0.06 | 2.3 | 0.13 | 0.007 | 0.024 | 1.74 | 1.87 | 0.9968 |
| A9 | 0.06 | 2.3 | 0.13 | 0.007 | 0.024 | 1.74 | 1.87 | 0.9948 |

TABLE 2

| Sample | Dielectric Constant | DF (%) | Db | X5R Characteristics |
|---|---|---|---|---|
| A1 | 3054.6 | 0.91 | 5.794 | OK |
| A2 | 3044.7 | 0.85 | 5.806 | OK |
| A3 | 2896.9 | 0.87 | 5.818 | OK |
| A4 | 2639.4 | 1.04 | 5.808 | OK |
| A5 | 2473.7 | 1.42 | 5.799 | OK |
| A6 | 2287.1 | 1.25 | 5.779 | OK |
| A7 | 2174.67 | 1.65 | 5.727 | OK |
| A8 | 2279.9 | 1.55 | 5.737 | OK |
| A9 | 2418.82 | 1.76 | 5.718 | OK |

EXAMPLE 2

Example 2 is an embodiment in which the content of the glassy component (BCG) and the sintering temperature are changed. Referring to Table 3, the content of the main component is fixed to be $(Ba_{0.09}Ca_{0.01})_{0.9968}TiO_3$ (BC1T)+0.75 mol % MgO+1.42 mol % $Y_2O_3$+0.0667 mol % MnO+0.074 mol % $V_2O_5$+1.14 mol % $Cr_2O_3$, and the content of the glassy component (BCG) is changed in a range of 0.48 to 1.27 mole %.

Table 4 shows characteristic behaviors of ceramic materials obtained by sintering 4 groups (B1-B4) of raw materials shown in Table 3 at different sintering temperatures of 1190° C., 1205° C., 1220° C., and 1235° C. It can be known from Table 4 that sintered densities are all higher than 5.6 g/cm³, a maximal dielectric constant is up to 3550, and the characteristic behaviors all meets the X5R specification.

TABLE 3

| No. | BC1T | MgO | $Y_2O_3$ | MnO | $V_2O_5$ | $Cr_2O_3$ | BCG | A/B |
|---|---|---|---|---|---|---|---|---|
| B1 | 100 | 0.75 | 1.42 | 0.0667 | 0.074 | 1.14 | 0.48 | 0.9968 |
| B2 | 100 | 0.75 | 1.42 | 0.0667 | 0.074 | 1.14 | 0.64 | 0.9968 |
| B3 | 100 | 0.75 | 1.42 | 0.0667 | 0.074 | 1.14 | 0.79 | 0.9968 |
| B4 | 100 | 0.75 | 1.42 | 0.0667 | 0.074 | 1.14 | 1.27 | 0.9968 |

TABLE 4

| Sample | S/T temp. (C.) | Dielectric Constant | DF (%) | Db | X5R Characteristics |
|---|---|---|---|---|---|
| B1 | 1235 | 3292 | 1.14 | 5.72 | OK |
|  | 1220 | 3360 | 1.14 | 5.71 | OK |
|  | 1205 | 3510 | 1.27 | 5.75 | OK |
|  | 1190 | 3549 | 2.11 | 5.68 | OK |
| B2 | 1235 | 3318 | 1.11 | 5.73 | OK |
|  | 1220 | 3398 | 1.52 | 5.72 | OK |
|  | 1205 | 3338 | 1.27 | 5.72 | OK |
|  | 1190 | 3353 | 1.66 | 5.68 | OK |
| B3 | 1235 | 3439 | 1.47 | 5.76 | OK |
|  | 1220 | 3466 | 1.06 | 5.74 | OK |
|  | 1205 | 3463 | 1.19 | 5.81 | OK |
|  | 1190 | 3535 | 1.35 | 5.71 | OK |
| B4 | 1235 | 3187 | 1.00 | 5.83 | OK |
|  | 1220 | 3278 | 0.99 | 5.76 | OK |
|  | 1205 | 3278 | 1.05 | 5.85 | OK |
|  | 1190 | 3350 | 1.44 | 5.73 | OK |

EXAMPLE 3

Example 3 is an embodiment in which amounts of MgO and $Y_2O_3$ in the main component are changed. Referring to Table 5, the content of the main component is fixed to be $(Ba_{0.98}Ca_{0.02})_{0.9968}TiO_3$ (BC2T)+$\alpha$MgO+$\beta Y_2O_3$+0.0667 mol % MnO+0.074 mol % $V_2O_5$+1.14 mol % $Cr_2O_3$, where $0.1 \leq \alpha \leq 3.0$, $0.05 \leq \beta \leq 3.0$, and the content of the glassy component (BCG) is 0.79 mole %.

Table 6 shows characteristic behaviors of ceramic materials obtained by sintering 7 groups (C1-C7) of raw materials shown in Table 5 at a sintering temperature of 1220° C. It can be known from Table 7 that the ceramic powder based compositions of Groups C1-C7 all have a sintered density higher than 5.6 g/cm³, and when the amounts of $\alpha$MgO and $\beta Y_2O_3$ are $0.1 \leq \alpha \leq 3.0$ and $0.05 \leq \beta \leq 3.0$ mole %, the characteristic behaviors all meets the X5R specification.

TABLE 5

| Sample No. | $\alpha$MgO + $\beta Y_2O_3$ | | | | | | | |
|---|---|---|---|---|---|---|---|---|
| | BC2T | MgO | Y2O3 | MnO | V2O5 | Cr2O3 | BCG | A/B |
| C1 | 100 | 0.05 | 1.42 | 0.0667 | 0.074 | 1.14 | 0.79 | 0.9968 |
| C2 | 100 | 1.5 | 1.42 | 0.0667 | 0.074 | 1.14 | 0.79 | 0.9968 |
| C3 | 100 | 2.25 | 1.42 | 0.0667 | 0.074 | 1.14 | 0.79 | 0.9968 |
| C4 | 100 | 3.25 | 1.42 | 0.0667 | 0.074 | 1.14 | 0.79 | 0.9968 |
| C5 | 100 | 1.5 | 0.62 | 0.0667 | 0.074 | 1.14 | 0.79 | 0.9968 |
| C6 | 100 | 1.5 | 2.22 | 0.0667 | 0.074 | 1.14 | 0.79 | 0.9968 |
| C7 | 100 | 1.5 | 3.02 | 0.0667 | 0.074 | 1.14 | 0.79 | 0.9968 |

TABLE 6

| Sample | Dielectric Constant | DF (%) | Db | MLCC, TCC (%) at (° C.) −50 | 85 |
|---|---|---|---|---|---|
| C1 | 5.74 | 3166 | 53.4 | 2.41 | −15.4 |
| C2 | 5.76 | 3321 | 58.9 | 1.21 | −12.2 |
| C3 | 5.69 | 3070 | 60.3 | 1.21 | −9.1 |
| C4 | 5.42 | 2950 | 63.9 | 1.07 | −7.5 |
| C5 | 5.72 | 3145 | 59.2 | 1.32 | −9.7 |
| C6 | 5.81 | 3190 | 58.7 | 1.17 | −13.9 |
| C7 | 5.79 | 3041 | 58.7 | 1.18 | −17.8 |

EXAMPLE 4

Example 4 is an embodiment in which amounts of MnO and $V_2O_5$ in the main component are changed. Referring to Table 7, the contents of the main component is fixed to be $(Ba_{0.98}Ca_{0.02})_{0.9968}TiO_3+0.75$ MgO+1.42 $Y_2O_3+\gamma$ mol % MnO+$\delta$ mol % $V_2O_5$+1.14 mol % $Cr_2O_3$, where $0.001 \leq \gamma \leq 0.2$, and $0.0 < \delta \leq 0.1$, and the content of the glassy component (BCG) is 0.79 mole %.

Table 8 shows characteristic behaviors of ceramic materials obtained by sintering 5 groups (D1-D5) of raw materials shown in Table 7 at 1220° C. It can be known from Table 8 that the ceramic powder based compositions of Groups D1-D5 all have a sintered density higher than 5.6 g/cm³, and when the amounts of $\gamma$MnO+$\delta V_2O_5$ are $0.001 \leq \gamma \leq 0.2$ and $0.0 \leq \delta \leq 0.1$ mole %, the characteristic behaviors all meets the X5R specification.

TABLE 7

| Sample No. | | | | $\gamma$MnO + $\delta V_2O_5$ | | | | |
|---|---|---|---|---|---|---|---|---|
| | BC2T | MgO | Y2O3 | MnO | V2O5 | Cr2O3 | BCG | A/B |
| D1 | 100 | 0.75 | 1.42 | 0.005 | 0.074 | 1.14 | 0.79 | 0.9968 |
| D2 | 100 | 0.75 | 1.42 | 0.0667 | 0.074 | 1.14 | 0.79 | 0.9968 |
| D3 | 100 | 0.75 | 1.42 | 0.25 | 0.074 | 1.14 | 0.79 | 0.9968 |
| D4 | 100 | 0.75 | 1.42 | 0.0667 | 0.01 | 1.14 | 0.79 | 0.9968 |
| D5 | 100 | 0.75 | 1.42 | 0.0667 | 0.15 | 1.14 | 0.79 | 0.9968 |

TABLE 8

| Sample | Dielectric Constant | DF (%) | Db | MLCC, TCC (%) at (° C.) −50 | 85 |
|---|---|---|---|---|---|
| D1 | 5.75 | 3398 | 55.4 | 1.87 | −13.7 |
| D2 | 5.74 | 3466 | 55.8 | 2.03 | −13.8 |
| D3 | 5.69 | 3296 | 54.9 | 2.98 | −15.7 |
| D4 | 5.69 | 3189 | 59.6 | 2.10 | −13.9 |
| D5 | 5.81 | 3415 | 54.1 | 2.32 | −14.8 |

EXAMPLE 5

Experiments were conducted with Sample A2 in Example 1 and Sample B4 in Example 2, to observe a relation between the capacitance variation and the temperature. FIG. 1 is a relation diagram of the capacitance variation of multi-layer ceramic capacitors of Samples A2 and B4. It can be known from FIG. 1 that the multi-layer ceramic capacitors of Samples A2 and B4 have a capacitance variation meeting the X5R temperature range, that is, has a relative capacitance variation of ±15% in a temperature range of −55° C. to 85° C.

Figure 2:
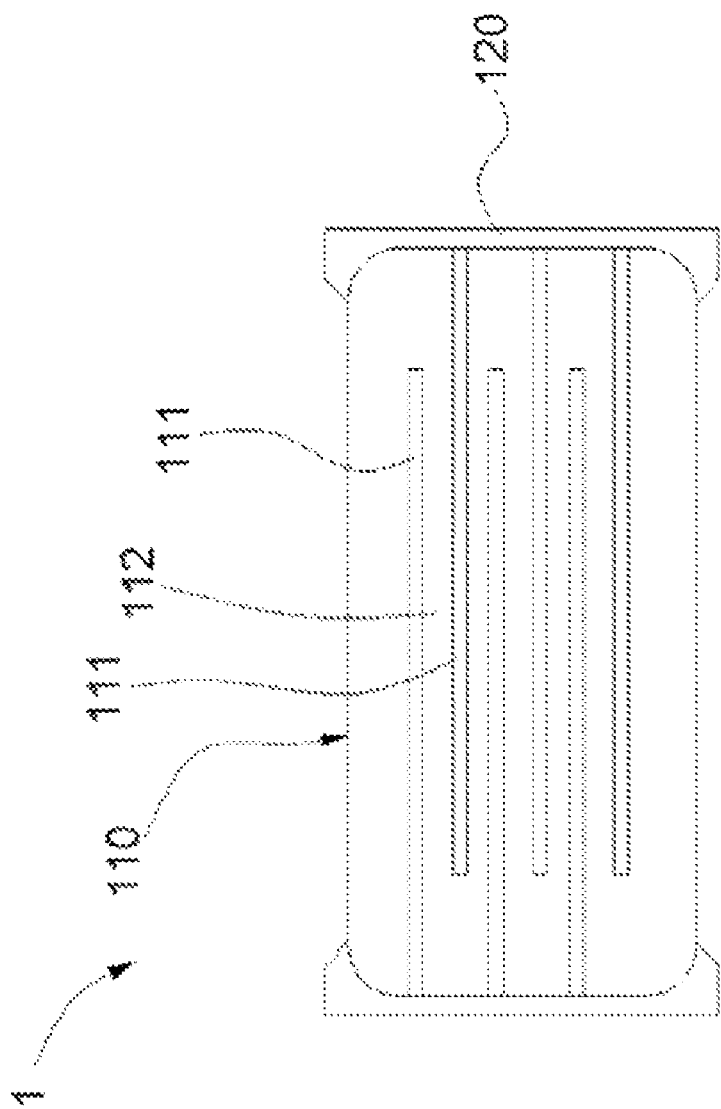
FIG. 2 is a sectional view of a structure of a multi-layer ceramic capacitor.

The ceramic powder composition of the present invention is mainly used in a multi-layer ceramic capacitor device. FIG. 2 is a sectional view of a structure of a multi-layer ceramic capacitor. As shown in FIG. 4, a multi-layer ceramic capacitor 1 comprises a ceramic capacitor body 110 and an external electrode 120. The ceramic capacitor body 110 comprises a plurality of dielectric ceramic layers 112 and a plurality of internal electrodes 111 formed along surfaces of the dielectric ceramic layers, and the external electrode 120 is formed out of the ceramic capacitor body 110, and is electrically connected to a part of the internal electrodes 111. The internal electrodes 111 may be nickel electrodes.

It should be particularly noted that the dielectric ceramic layers 112 of the multi-layer ceramic capacitor 1 are formed by sintering the ceramic powder composition of the present invention at a sintering temperature of 1190-1300° C. After sintering, it can be known from experimental results that the multi-layer ceramic capacitor formed by the dielectric ceramic layers 112 formed by sintering the ceramic powder composition of the present invention has a capacitance variation meeting the X5R temperature range, that is, has a relative capacitance variation of ±15% in a temperature range of −55° C. to 85° C. Thus, a multi-layer ceramic capacitor meeting the X5R temperature range is provided.

In summary, the present invention provides a ceramic powder composition, a ceramic material, and a multi-layer ceramic capacitor fabricated thereby that meet the X5R temperature range by combining a main component with a glassy component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ceramic powder composition, comprising
   a main component, comprising $(Ba_{1-x}Ca_x)mTiO_3+\alpha MgO+\beta Re_2O_3+\gamma MnO+\delta B_2O_5$, wherein $\alpha$, $\beta$, $\gamma$ and $\delta$ are molar ratio constants, and $0.1 \leq \alpha \leq 3.0$, $0.05 \leq \beta \leq 3.0$, $0.001 \leq \gamma \leq 0.2$, and $0.0 < \delta \leq 0.1$; $0.99 \leq m \leq 1.030$, and $0.005 \leq x \leq 0.015$; element Re is selected from a group consisting of yttrium (Y), chromium (Cr), terbium (Tb), dysprosium (Dy), holmium (Ho), erbium (Er), thulium (Tm), and ytterbium (Yb); and element B is selected from a group consisting of vanadium (V), niobium (Nb), and tantalum (Ta); and
   a glassy component, having a content of 0.2-2.0 mole % based on the main component, and comprising $(Ba_yCa_{1-y})SiO_3$, wherein $0 < y < 1$.

2. The ceramic powder composition according to claim 1, wherein a numerical value range of y is essentially $0.3 \leq y \leq 0.6$.

3. The ceramic powder composition according to claim 1, wherein the element B is essentially vanadium (V).

4. The ceramic powder composition according to claim 1, wherein the element Re is essentially yttrium (Y) or chromium (Cr).

5. A ceramic material, formed by sintering the ceramic powder composition according to claim 1.

6. The ceramic material according to claim 5, wherein a sintering temperature for the ceramic material is 1190-1300° C.

7. A multi-layer ceramic capacitor, comprising:
 a ceramic dielectric, formed by sintering a dielectric ceramic composition comprising:
  a main component, comprising $(Ba_{1-x}Ca_x)mTiO_3 + \alpha MgO + \beta Re_2O_3 + \gamma MnO + \delta B_2O_5$, wherein $\alpha, \beta, \gamma$ and $\delta$ are molar ratio constants, and $0.1 \leq \alpha \leq 3.0$, $0.05 \leq \beta \leq 3.0$, $0.001 \leq \gamma \leq 0.2$, and $0.0 < \delta \leq 0.1$; $0.99 \leq m \leq 1.030$, and $0.005 \leq x \leq 0.015$; element Re is selected from a group consisting of yttrium (Y), chromium (Cr), terbium (Tb), dysprosium (Dy), holmium (Ho), erbium (Er), thulium (Tm), and ytterbium (Yb); and element B is selected from a group consisting of vanadium (V), niobium (Nb), and tantalum (Ta); and
  a glassy component, having a content of 0.2-2.0 mole % based on the main component, and comprising $(Ba_y Ca_{1-y})SiO_3$, wherein $0 < y < 1$;
 a plurality of internal electrodes, substantially extending in parallel in the ceramic dielectric; and
 at least one external electrode, exposed out of the ceramic dielectric, and electrically connected to the internal electrodes.

8. The multi-layer ceramic capacitor according to claim 7, wherein the multi-layer ceramic capacitor has a capacitance variation meeting the X5R temperature range, that is, has a relative capacitance variation of ±15% in a temperature range of −55° C. to 85° C.

9. The multi-layer ceramic capacitor according to claim 7, wherein the internal electrodes are nickel electrodes.

10. The multi-layer ceramic capacitor according to claim 7, wherein a numerical value range of y is essentially $0.3 \leq y \leq 0.6$.

11. The multi-layer ceramic capacitor according to claim 7, wherein the element B is essentially vanadium (V).

12. The multi-layer ceramic capacitor according to claim 7, the element Re is essentially yttrium (Y) or chromium (Cr).

13. The multi-layer ceramic capacitor according to claim 7, wherein a sintering temperature for the ceramic material is 1190-1300° C.

* * * * *